C. T. DU RELL.
MIXER AND DISINTEGRATOR.
APPLICATION FILED JAN. 5, 1915.
1,157,092.
Patented Oct. 19, 1915.
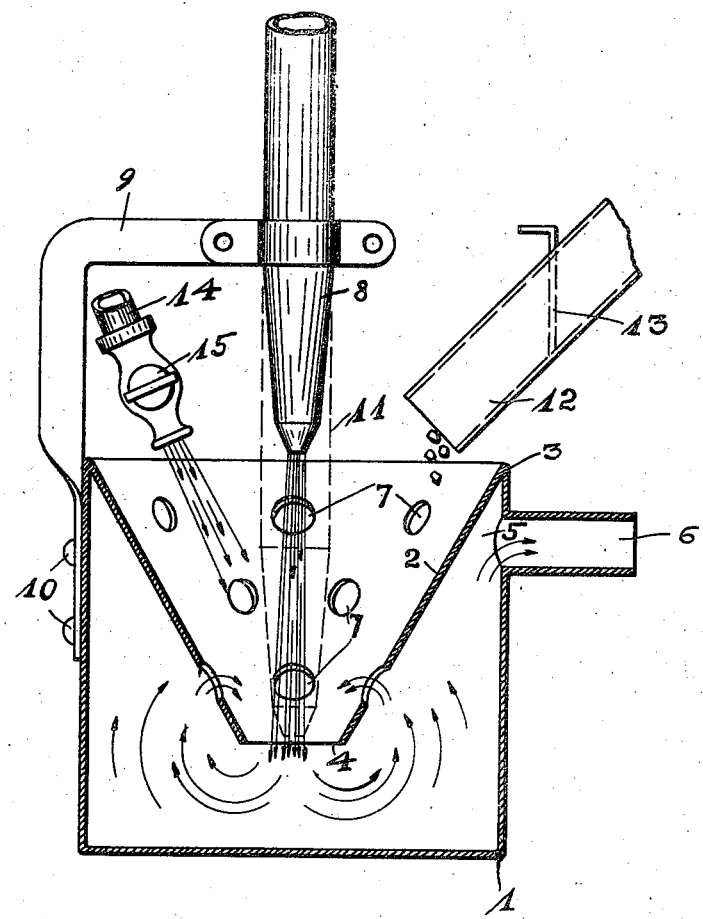

UNITED STATES PATENT OFFICE.

CHARLES T. DU RELL, OF LOS ANGELES, CALIFORNIA.

MIXER AND DISINTEGRATOR.

1,157,092.  Specification of Letters Patent.  Patented Oct. 19, 1915.

Application filed January 5, 1915. Serial No. 709.

*To all whom it may concern:*

Be it known that I, CHARLES T. DU RELL, a citizen of the United States, residing at Los Angeles, in the county of Los Angeles and State of California, have invented a new and useful Mixer and Disintegrator, of which the following is a specification.

My invention relates to improvements in mixers and disintegrators in which a vertically adjustable vortex jet is provided to force a liquid into and through the truncation of a cone in the mixer and disintegrator; and the objects of my improvements are, first, to provide a truncated cone inside of the casing of the mixer with its truncated end hanging downwardly into the casing, while the base of the cone is attached to the upper end of the casing; second, to provide a vortex jet concentrically to the casing and to the cone, vertically adjustable above and into the cone; third, to provide holes in the walls of the cone, allowing the mixture to boil and agitate below and above the cone; fourth, to provide a discharge opening slightly below the junction of the base of the cone with the casing; and, fifth, to provide chutes through which to direct liquids, solids and gases into the mixer. I attain these objects by the combination, construction and arrangement of devices hereafter described and claimed, and illustrated in the accompanying drawing, which is showing a vertical sectional view of my device.

Similar numbers refer to similar parts throughout the papers.

The casing 1 of my mixer is on its upper end rigidly connected with the base of the truncated cone 2, as indicated at 3, while the truncated end 4 of the cone 2 is hanging downwardly into the casing 1. Slightly below the junction of the base of the cone 2 with the upper end of the casing 1 is the discharge opening 5 with an outlet-gutter or tube, indicated at 6. For mixtures, subject to froth, the cone 2 may be attached to the casing far enough below the edge 3, allowing the casing 1 to form a rim to extend high enough above the cone 2, preventing the froth to overflow.

The truncated cone 2 is provided with holes 7, the purpose of which will be described later on.

A vortex jet 8 is arranged concentrically to the casing 1 and to the cone 2, being vertically adjustably held by an arm 9, which is attached to the casing 1 as indicated at 10, to be lowered into the cone 2, as indicated by the dotted lines 11, in case that not much air or gas is wanted in the mixture.

A chute 12 is with its end shown just above the cone 2 to discharge a solid into my mixer. The chute can be shut off by the valve 13. In the same manner is a tube 14 with a cock 15 arranged to discharge any other liquid or gas into the mixer, additional to the liquid coming out of the vortex jet 8. And it will easily be understood that any number of chutes and tubes can be had for any number of additional liquids, gases, solids and the like, to be mixed together.

The liquid coming out of the vortex jet 8, being forced into and through the truncation 4 of the cone 2, causes a violent boiling and agitation in the mixer, by which the mixture from below the cone 2 is running back through the holes 7 from where it is again and again forced into and through the truncated cone 2. By this boiling and agitation, any solid, as sand, clay and the like, which can be broken up by a jet, being fed into the mixer by the chutes 12, will be mixed with the liquid coming out from the vortex jet 8, and it will be mixed also with any additional gas or other liquid to be discharged into the mixer from the tubes 14, agitating, disintegrating and mixing, as any heavy piece will sooner go through the lower holes 7 in the cone 2 before it will escape through the discharge opening 5, and thus a good equalized stream will flow out of the mixer at the discharge opening 5. The liquid from the vortex jet will also produce a certain suction in the cone 2, which will cause air to be drawn into the mixer.

In case that my mixer is used in a room filled with gas, this gas will also be drawn into the mixer, supersaturating the mixture with the gas. Thus any mixture can be supersaturated with air or gas, and this supersaturated mixture can be drawn off from the outlet-gutter or tube 6.

Having thus described my invention I claim:

A device for the purpose described, consisting of a casing having an outlet near its upper edge, a truncated cone connected at its upper and larger end to the upper end of said casing and having openings in its sides, feeding means suitably arranged to the device having adjusting means adapted to discharge different solids and liquids into said cone in certain quantities, and a vortex jet suitably supported on said casing and adapted to discharge into said cone, all substantially as described.

In testimony whereof I hereunto affix my signature in the presence of two witnesses.

CHARLES T. DU RELL.

Witnesses:
OTTO H. RMEGER,
FRANK E. EAKER.